May 31, 1949.　　　　S. STELMACK　　　　2,471,660
STORAGE BATTERY WITH LEVEL INDICATOR
Filed Feb. 27, 1945　　　　　　　　　　2 Sheets-Sheet 1
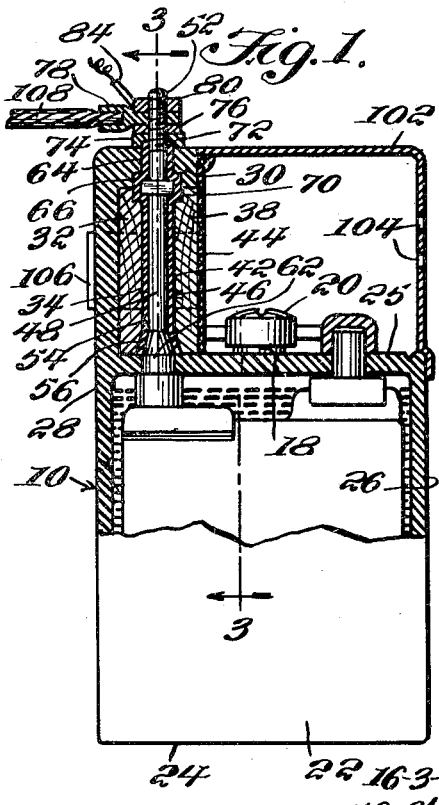
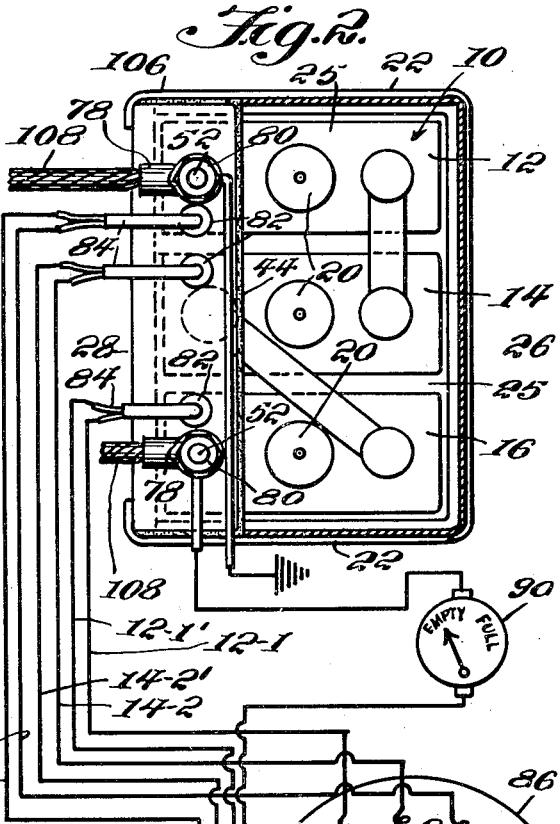
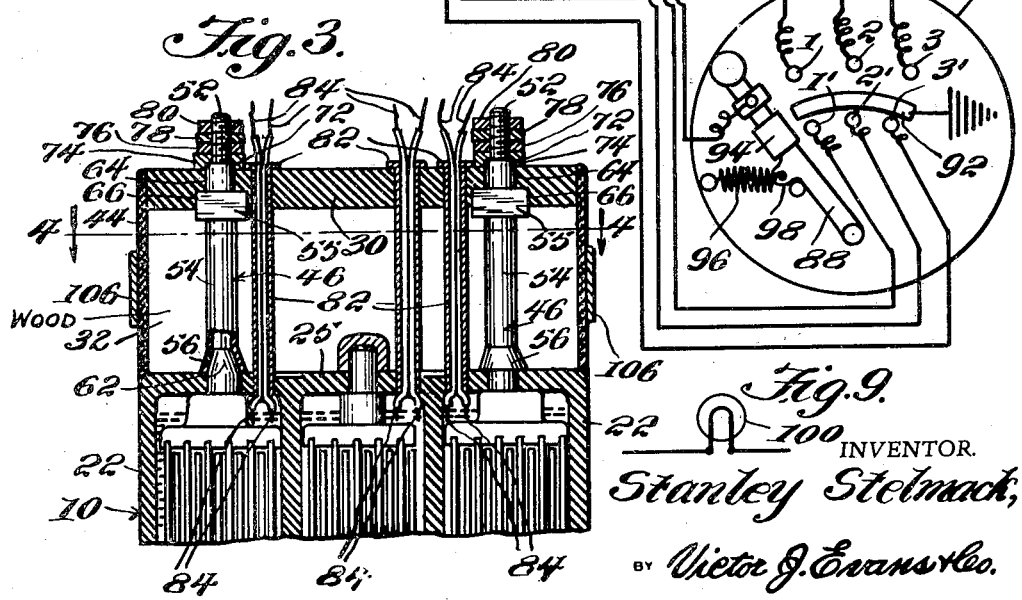
INVENTOR.
Stanley Stelmack,
BY Victor J. Evans & Co.
ATTORNEYS

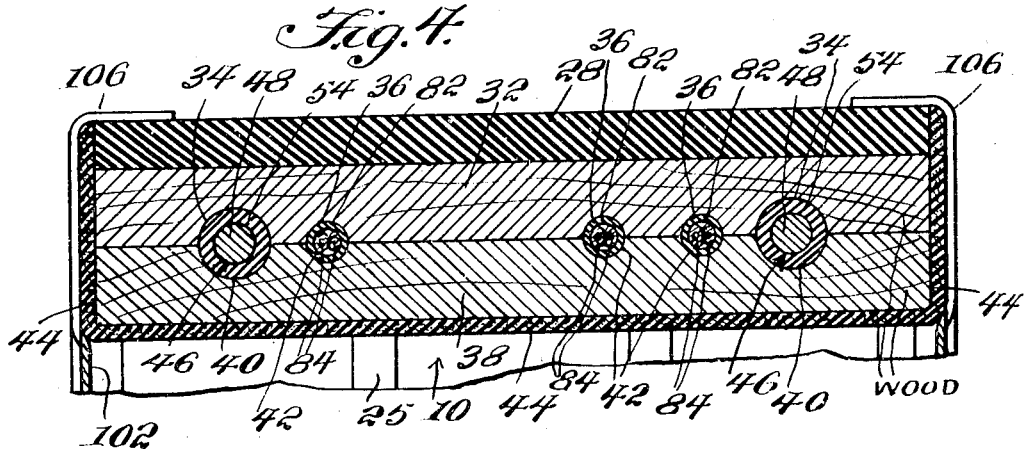

Patented May 31, 1949

2,471,660

UNITED STATES PATENT OFFICE 2,471,660

STORAGE BATTERY WITH LEVEL INDICATOR

Stanley Stelmack, Philadelphia, Pa.

Application February 27, 1945, Serial No. 579,969

2 Claims. (Cl. 136—182)

1

This invention relates to improvements in storage batteries having means incorporated therein for indicating the height of the electrolyte in the cells of the battery.

One of the main objects of the invention is to provide a battery that is constructed to prevent acid from corroding the terminals of the battery and at the same time provide means therein for determining the height of the electrolyte.

Another object of the invention is to provide means associated with the battery at a point remote from the battery that will indicate the condition of the battery.

A further object of the invention is to provide a battery that will have a terminal that will permit the use of a cable having both connecting ends thereof formed in the same manner, thereby decreasing the cost of the cable.

Other objects and advantages of the invention will appear from the following description and accompanying drawings in which similar characters of reference indicate similar parts throughout the several views.

In the drawings:

Fig. 1 is a side elevation of the device showing parts in section and part broken away.

Fig. 2 is a top plan view thereof showing how the device is connected to the indicator by the electric circuits which are shown diagrammatically in this view.

Fig. 3 is a sectional view on the line 3—3 of Fig. 1.

Fig. 4 is an enlarged section on line 4—4 of Fig. 3.

Fig. 5 is a side view of one of the insulating blocks.

Fig. 6 is a top plan view thereof.

Fig. 7 is a sectional view of one of the battery terminals.

Fig. 8 is a plan view of the type of cable adapted for use with the device.

Fig. 9 is a modification of the indicator for use with the device, and

Figure 10 is a sectional view on the line 10—10 of Figure 7.

Referring more in detail to the drawings, the numeral 10 designates the battery proper, having the usual cells 12, 14 and 16. The cells are provided with filling openings 18, which are closed by the plugs 20 which are formed of any well-known composition.

The battery 10 has the usual side walls 22, bottom 24, top 25, and front wall 26, but the rear wall 28 extends upwardly above the top 25 and

2 has a forwarding projection flange 30 formed integral therewith as are the other parts of the battery 10.

Positioned between the flange 30 and the top 25 of the battery in such a manner that it contacts the rear wall 28 is a block 32 of insulating material such as wood, rubber composition or any suitable electrically non-conducting substance.

The block 32 is provided with terminal receiving openings 34 and circular openings 36. A similar block 38 is provided with matching openings 40 and 42 and is positioned in face to face relation with the block 32 within the limits of the projecting flange 30.

The blocks 32 and 38 are retained in place and protected by an insulating coating 44 formed from any suitable sealing substance such as pitch tar compounds.

The flange 30 and the blocks 32 and 38 and coating 44 are provided to protect the terminals 46 from coming in contact with the acid in the battery.

The terminals 46 have an inner copper post 48 provided with an integral circular collar 50 and a screw threaded upper end 52, a lead casing 54 having a flared lower portion 56 and a circular projection 55 having a circular recess 58 therein to conform to the circular collar 50 of the copper post 48 is brazed on the post 48.

The flared portion 56 is adapted to be connected to the negative and positive plate terminals 60 and 62 of the battery 10 and extend upwardly beyond the flange 30 and be received in openings 64 in the flange 30, the openings 64 being recessed at the lower edge 66, to receive the projection 55 of the lead casing 54.

The openings in the blocks 32 and 38 are flared at 68 to receive the flared portion 56 of the lead casing 54 and provided with a circular recess at 70 to receive the projections 55 of the lead casing 54.

The lead casing 54 extends beyond the flange 30 and is adapted to be received in a circular recess 72 in a retaining nut 74.

A washer 76 is positioned on the nut 74 and the cable connection 78 is then placed over the terminal 46 and retained thereon by means of a nut 80. In like manner is the other terminal of the battery connected.

In order that both the negative and positive terminals may be positioned below the flange 30, the cells are connected as shown in Fig. 2.

Composition tubes 82 are received in the circular openings 36 to support indicating electrodes 84 in each of the cells in the battery. The electrodes 84 are normally immersed in the electrolyte of the cells, and each of the cells is provided with two wire leads. The wires connect with their respective switch posts as shown in Fig. 2. Thus the lead 12—1 connects one electrode 84 of a pair to post 1 of the switch 86. Similarly, leads 14—2 and 16—3 connect one electrode 84 of the remaining pairs to posts 2 and 3, respectively. The remaining electrodes 84 are connected by leads 12—1', 14—2' and 16—3' to the posts 1', 2' and 3', respectively.

The switch lever 88 has a wire leading to the positive pole of the battery and an electric meter 90 is interposed therein.

An arcuate switch plate 92 is interposed between the posts 1 to 3, inclusive, and posts 1' to 3' inclusive, and grounded to the car body. A contact collar 94 on the lever 88 is adapted to slidably contact the plate 92 and energize the meter 90 to indicate the height of the electrolyte in the cells. A coil spring 96, connected to an eye 98 on the lever 88, biases the lever to an inoperative position.

In Fig. 9 a light 100 is shown which can be substituted for the meter 90.

To protect the top of the battery there is provided a metal cover 102 having vent holes 104 in the front wall thereof, and a band 106 secured to the side walls of the cover 102 encircles the rear wall of the battery to retain the cover on the battery.

The cable 108 having similar connections 78 is used with the battery 10 and thus either end of the cable can be connected to the battery or starter of the car.

When it is desired to determine the charge of a cell of the battery the switch is moved to the right until the posts 1 and 1' are bridged, at which time if the electrolyte is at the proper level the meter will register full, but if not the needle will not register, indicating that the cell needs water.

However, when the indicating means is not in use the switch will remain inoperative, the circuits open and will not be closed until the lever is again operated.

From the foregoing description, it will be readily seen that there has been provided a device that fulfills the purpose for which it has been devised.

While this specification sets forth in detail the present construction of the device, deviations from such detail may be resorted to as do not form a departure from the spirit of the invention as defined by the appended claims.

Having thus described the invention what is claimed as new and useful and desired to be secured by Letters Patent is:

1. A storage battery comprising a multicell body having an upstanding rear wall portion, a flange formed integral with said wall and extending parallel to the top of said body, terminal posts for said body extending upwardly from the same and through said flange, insulating means positioned beneath said flange embedding said posts between said body and said flange and electrodes in said insulating means adapted to be connected to a remotely-located indicator to indicate the height of liquid in said cells.

2. The invention as described in claim 1, wherein a coating is provided to protect the insulating means positioned beneath said flange.

STANLEY STELMACK.

REFERENCES CITED

The following references are of record in the file of this patent:

UNITED STATES PATENTS

| Number | Name | Date |
|---|---|---|
| 1,136,075 | Whitney | Apr. 20, 1915 |
| 1,160,491 | Brown | Nov. 16, 1915 |
| 1,522,719 | Gould et al. | Jan. 13, 1925 |
| 1,770,975 | Everett | July 22, 1930 |
| 1,818,185 | Yull | Aug. 11, 1931 |
| 2,120,822 | Wheat | June 14, 1938 |
| 2,254,110 | Petrosky | Aug. 26, 1941 |
| 2,294,427 | Spicer | Sept. 1, 1942 |

FOREIGN PATENTS

| Number | Country | Date |
|---|---|---|
| 293,825 | Great Britain | Nov. 15, 1928 |